Aug. 9, 1938. G. DARRIEUS Re. 20,820

PROTECTIVE SYSTEM

Original Filed Feb. 21, 1931

Inventor
Georges Darrieus
By Alfred H. Lyon
Attorney.

Reissued Aug. 9, 1938

Re. 20,820

UNITED STATES PATENT OFFICE 20,820

PROTECTIVE SYSTEM

Georges Darrieus, Houilles, France, assignor to Aktiengesellschaft Brown Boveri & Cie., Baden, Switzerland, a joint-stock company of Switzerland Original No. 1,987,285, dated January 8, 1935, Serial No. 517,548, February 21, 1931. Application for reissue November 9, 1936, Serial No. 109,948. In France February 22, 1930

19 Claims. (Cl. 175—294)

This invention relates to electric circuit protection, and more particularly to improvements in protective systems for controlling alternating current circuits on the occurrence of abnormal conditions therein with a selective action in dependence on the impedance of the circuit between two points thereof, whereby a section of the circuit, on which a fault connection occurs, may be selectively interrupted without affecting the continuity of service of the remainder of the circuit.

In such systems of electric circuit protection, it is usual to employ relays operating on the impedance principle with a time-delay action, i. e., relays operating on the ratio between the voltage and current $$\left(\frac{E}{I}\right)$$

Such relays, as is well known, are connected with a circuit at suitable section junction points, such as distributing stations and the like, so that the relays nearest to the fault connection operate first and isolate the faulty section of the circuit without interruption of the continuity of service on the sound sections of the circuit. In the utilization of such relays for the selective protection of electric circuits, the circuit interrupting times thereof should correspond to the impedance of the circuit, which is proportional to the length of the circuit from the point of the relay connection thereto to the point of fault connection, that is, the circuit interrupting times should be proportional to the distance of the fault from the relays.

It has been found, however, that the impedance measured by such relays is also dependent on the distribution of the current so that it is not a function of only the distance of the fault from the relay, and thus the time gradations and the operation of the relays may be affected.

One feature of the present invention is, therefore, a protective system for electric circuits employing relays operating on the impedance principle, arranged and connected with a circuit to be protected in such a manner as to be selectively operative to cause disconnection of a faulty section of the circuit, in a time in dependence upon the distance of the fault connection point from the connection points of the relays; and regardless of whether the fault connection be between one or more of the phase conductors and ground, or whether the fault connection be between all the phase conductors of the circuit.

Figure 1:
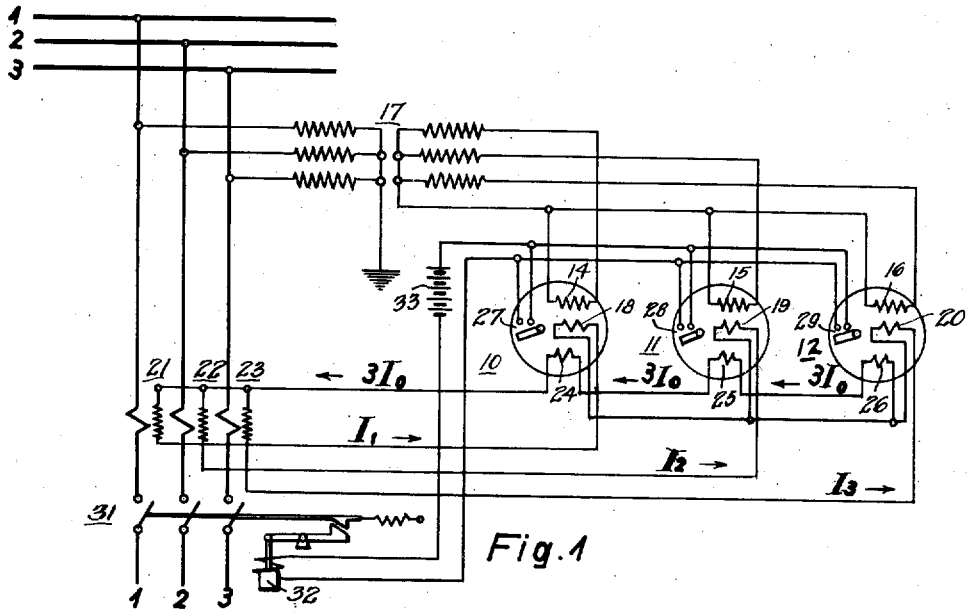
Figure 2:
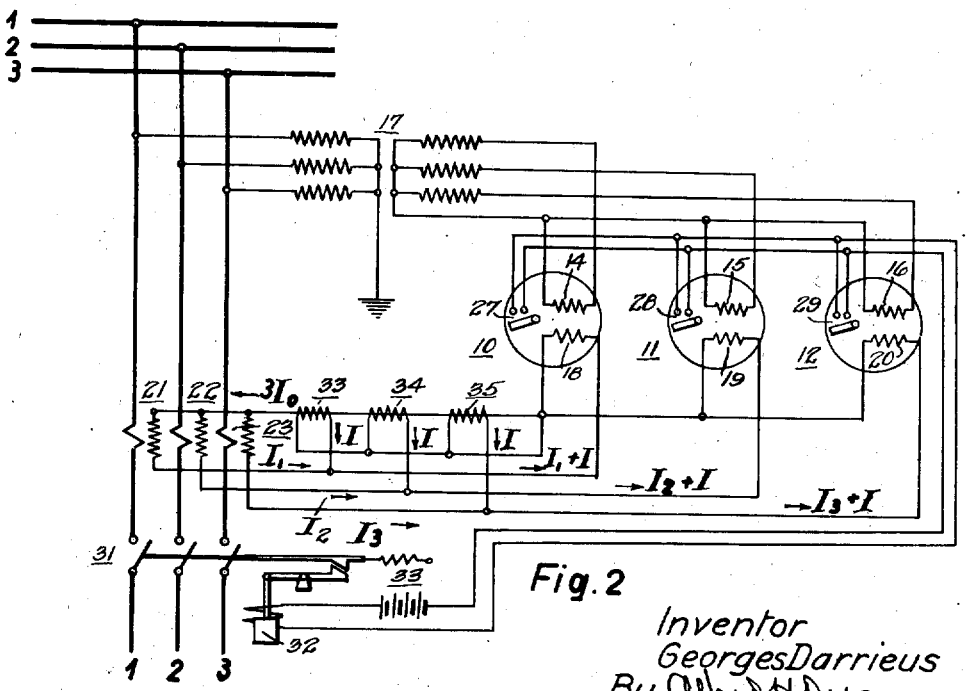

Other features and objects of the invention will be apparent to those skilled in the art from the following description and claims when read in connection with the accompanying drawing in which:

Figure 1 is a schematic diagram showing, for purposes of illustration, one arrangement of apparatus and connections, wherein a plurality of relays of the impedance type are arranged and connected in circuit with the respective phases of a polyphase alternating current circuit in such a manner as to be selectively responsive to the impedance of the line upon the occurrence of a fault connection therein; and Figure 2 is a schematic diagram showing, also for purposes of illustration, a modified embodiment of the invention, wherein the connections of the apparatus are arranged in a manner somewhat different from the arrangement in the embodiment according to Figure 1 of the drawing.

The arrangement of the apparatus and its operation, and the following explanations with respect thereto, are predicated upon Fortescue's well known Method of Symmetrical Co-ordinates (Transactions of American Institute of Electrical Engineers, Vol. XXXII part 2, p. 1027, et seq.); and Symmetrical Components by Wagner and Evans (The Electric Journal, Vol. XXV, No. 3, p. 151, et seq.).

In this method, the system of any three phase currents $I_1$, $I_2$, $I_3$ is replaced by three symmetrical systems: the positive sequence system is represented by three currents of equal magnitude $I_d$ in three phases, but each displaced relative to one another by 120° in a positive sense; the negative sequence system is also represented by three currents of equal magnitude $I_i$, but each displaced relative to one another by 120° in a negative sense; lastly, there is the zero sequence system represented by three parallel currents of equal magnitude $I_o$.

Hence:—

$$\left.\begin{aligned} I_0 &= I_0 + I_d + I_i \\ I_0 &= I_0 + I_d\epsilon^{-j120°} + I_j\epsilon^{j120°} \\ I_0 &= I_0 + I_d\epsilon^{-j240°} + I_j\epsilon^{j240°} \end{aligned}\right\} \qquad (1)$$

The total voltage drop along the line is made up of the separate values of the drops in voltage caused by the various current systems, and is determined for the different disturbances as follows:—

*Case I.—Single-phase fault to ground*

The voltage to ground of the affected phase at any point in the network is given in terms of symmetrical components by the following equation:—

$$E_1 = Z_d I_d + Z_i I_i + Z_0 I_0$$

where $Z_d$, $Z_i$, $Z_0$, are the positive, negative, and zero sequence system impedances respectively of such phase conductor portion thereof from the point considered therein to the ground fault. Since in transmission lines $Z_d = Z_i$, the above equation becomes:—

$$E_1 = Z_d(I_d + I_i) + Z_0 I_0$$

$$= Z_d(I_d + I_i + I_0) + (Z_0 - Z_d) I_0$$

$$E_1 = Z_d I_1 + (Z_0 - Z_d) I_0 = Z_d\left[I_1 + \left(\frac{Z_0}{Z_d} - 1\right) I_0\right] \quad (2)$$

but according to Equation (1)

$$3I_0 = I_1 + I_2 + I_3$$

and therefore $$E_1 = Z_d\left[\frac{2 + \frac{Z_0}{Z_d}}{3} I_1 + \frac{\frac{Z_0}{Z_d} - 1}{3}(I_2 + I_3)\right] \quad (3)$$

When the coils of a relay of the impedance type, i. e., responsive to the ratio $$\frac{E}{I}$$

of a voltage to a current, are energized according to the values $E_1$, $I_1$, respectively, such relay will operate in response to the value of a fictitious impedance.

$$Z = \frac{E_1}{I_1}$$

which from Equation (2) is always equal to:

$$Z = \frac{E_1}{I_1} = Z_d\left[1 + \left(\frac{Z_0}{Z_d} - 1\right)\frac{I_0}{I_1}\right] \quad (4)$$

Z is, therefore, not only dependent on the line constants $Z_d$ and $Z_0$, but also on the ratio $$\frac{I_0}{I_1}$$

of the zero sequence to the phase current. This relation can, however, vary according to the position of the ground fault, the place, and method of grounding the neutral point of the network, so that the relays may measure different impedances for the same distances from the ground fault.

*Case II.—2-phase fault to ground, for instance, phases 1 and 2*

Assuming that a separate relay is inserted in each faulty phase, the Equations (2), (3), and (4) also apply. To these, however, must be added the corresponding equations for phase 2, for example, $$E_2 = Z_d\left[I_2 + \left(\frac{Z_0}{Z_d} - 1\right) I_0\right] \quad (5)$$

and $$Z' = \frac{E_2}{I_2} = Z_d\left[1 + \left(\frac{Z_0}{Z_d} - 1\right)\frac{I_0}{I_2}\right] \quad (4')$$

Here again the impedances measured by the relays are dependent on the ratios $$\left(\frac{I_0}{I_1}\right) \text{ and } \left(\frac{I_0}{I_2}\right)$$

and furthermore, may differ from each other since $$\frac{I_0}{I_1}$$

may be different from $$\frac{I_0}{I_2}$$

*Case III.—3-phase fault to ground or between phase conductors*

Here $$I_0 = 0 \text{ and } E_1 = Z_d I_1 \quad (6)$$

and the total impedance measured is $$Z = \frac{E_1}{I_1} = Z_d \quad (7)$$

i. e. is equal to the normal short circuit impedance of the line. This impedance is correct for distance, but is different from the values measured in Cases I and II.

In order to make the impedance measured by the relay independent of the fault conditions, then according to the invention, current $$I = I_0\left(\frac{Z_0}{Z_d} - 1\right) \quad (8)$$

is supplied to each relay in addition to the phase current. As is evident from the above Equations (2), (5), and (6), the impedance measured by the relays, and controlling the tripping times, are for each relay the equivalent of $$Z = \frac{E_1}{I_1 + \left(\frac{Z_o}{Z_d} - 1\right) I_0} = Z_d \quad (9)$$

and are consequently correct for distance and independent of the nature of the fault. ($I_0$ is 0 in Case III.) The value $$\frac{Z_0}{Z_d}$$

varies; for example, for transmission lines such value is, in most instances, approximately 4. Instead of supplying the relays with the corrective current I defined by Equation 8, it is then sufficient to apply current $3I_0$, i. e. the sum of the line currents. Naturally it suffices if the condition expressed in Equation (8) is only approximately satisfied, because this current acts only as a compensator.

According to Equation (3) all three currents $I_1$, $I_2$, and $I_3$, can also be supplied to the relays in order that the required result may be obtained.

Since Equation (2) is correct for each kind of ground fault, then in the case of several faults to ground, i. e. when ground faults occur simultaneously on two or more phases at different places on the network, the impedance measured by each relay corresponds to the correct distance from the fault of the corresponding phase.

In the 2-phase fault connection to ground the relays may also be so arranged that the line voltage, for example $$E_{12} = E_1 - E_2$$

and the difference of the phase currents $$I_1 - I_2$$

operate the relays. Then again, according to Equations (2) and (5) the impedance measured by the relays is:—

$$Z = \frac{E_{12}}{I_1 - I_2} = Z_d$$

The above improvements are applicable for overhead as well as cable transmission, and for single-phase systems, because the above equations are also valid for such systems. It is also immaterial whether the relays have a continuous or a stepped time-characteristic, and whether the tripping times are only dependent on the absolute values of the impedance, or also on the phase angle of the impedance to cause the relays to operate in dependence upon the value of the reactance component only of the line impedance.

The zero sequence current $I_0$, is, for instance, to be taken from the common neutral connection of the three current phase transformers connected in star, because from Equation (1)

$$I_0=\frac{I_1+I_2+I_3}{3}$$

From the foregoing explanations it will, it is believed, be obvious that the invention is not limited to the use of time-delay impedance responsive relays of any particular structural arrangement, and that the connection thereof may be modified to suit particular conditions. Thus, in the embodiment of the invention according to Fig. 1 of the drawing, there are shown the impedance responsive relays 10, 11, 12, as having voltage coils 14, 15, 16, respectively, connected to be energized in accordance with potentials of respective phase conductors 1, 2, 3, of the line by way of a grounded neutral star connected potential transformer 17; current coils 18, 19, 20, connected with the secondary windings of the respective current transformers 21, 22, 23, to be energized therefrom in accordance with the currents flowing in the respective phase conductors 1, 2, 3, of the line; and as having current coils 24, 25, 26, serially connected in circuit with a zero phase sequence conductor $3I_0$ to be thereby energized in accordance with the zero phase sequence current of the line. Thus, upon the occurrence of a fault connection between all of the phase conductors 1, 2, 3, or a fault connection between one or more of the phase conductors 1, 2, 3, and ground, the corresponding relay, or relays 14, 15, 16, will be actuated to close their respective contacts 27, 28, 29, to thereby establish the energizing circuit, including a source of current supply, for example, battery 33, for the tripping magnet 32 of the circuit breaker 31, in a period of time in dependence upon the ratio of the voltage impressed on the voltage coils 14, 15, 16, to the current flowing in the current coils 18, 19, 20 plus the zero phase sequence current, if any, flowing in their current coils 24, 25, 26.

The embodiment of the invention according to Fig. 2 of the drawing differs from the embodiment of Figure 1 of the drawing substantially only in that in the embodiment according to Figure 2, the zero phase sequence current windings of the relays 10, 11, 12, are dispensed with and the zero phase sequence currents are superimposed upon the phase conductor currents by means of auxiliary current transformers 33, 34, 35, respectively, energized from zero phase sequence conductor $3I_0$. Thus in the arrangement according to Figure 2 of the drawing the current windings 18, 19, 20, respectively, of the relays 10, 11, 12, are energized in accordance with the vectorial sum of the current flowing in the phase conductors and the current, if any, flowing in the zero phase sequence current conductor $3I_0$. Therefore, in the arrangement according to Figure 2, upon the occurrence of a fault connection between all phase conductors 1, 2, 3, of the line, or any fault connection between one or more of the phase conductors 1, 2, 3, and ground, the corresponding relay, or relays, 14, 15, 16, will be actuated to close their respective contacts 27, 28, 29, to establish thereby the energizing circuit, including the source of current supply 33, for the tripping magnet 32 of the circuit breaker 31, in a period of time in dependence only upon the ratio of the voltage impressed on the voltage coils 14, 15, 16, to the current flowing in the current coils 18, 19, 20, i. e., the vectorial sum of the respective phase currents and the zero phase sequence current.

It is claimed and desired to secure by Letters Patent:

1. In combination with a polyphase electric circuit, an electroresponsive device operable in dependence upon the voltage of one of the phase conductors of said circuit to ground divided by the quantity (line current in said conductor plus the sum of the currents flowing in all phase conductors of said circuit) comprising winding means operatively connected with the first said phase conductor and responsive to the voltage thereof to ground, and means comprising winding means cooperating with the first said means and operatively connected with said circuit responsive to the current in the first said conductor plus the sum of the currents flowing in all phase conductors of said circuit.

2. In combination with a polyphase electric circuit, an electroresponsive device operable in dependence upon the voltage of one of the phase conductors of said circuit to ground divided by the quantity (line current in said conductor plus a current proportional to the zero phase sequence current of the said circuit) comprising winding means operatively connected with the first said phase conductor and responsive to the voltage thereof to ground, and means comprising winding means cooperating with the first said means and operatively connected with said circuit responsive to the current in the first said phase conductor plus a current proportional to the zero phase sequence current of the said circuit.

3. In combination with a polyphase electric circuit subject to ground fault connections therewith, an electroresponsive device connected with a phase conductor of said circuit and operable, upon the occurrence of a fault connection of said phase conductor with ground, in dependence upon the impedance of said phase conductor from the point of connection of said device therewith to the point of said fault connection comprising winding means operatively connected with said phase conductor and responsive to the voltage thereof to ground, and means comprising winding means cooperating with the first said means and operatively connected with said circuit responsive to the flow of current in said phase conductor and to the sum of the currents flowing in all phase conductors of said circuit.

4. In a protective system for electric circuits, a polyphase line subject to the occurrence of ground fault connections therein, a plurality of selectively operated impedance responsive relays for controlling said line, there being one relay for each phase conductor of said line, each said relay having a potential winding connected to be energized in accordance with the potentials to ground of the respective phase conductors upon the occurrence of a ground fault connection therein, a current winding connected in series relation with the respective phase conductors of said line to be energized in accordance with the current flowing therein, and a winding connected with said line to be energized in accordance with the zero phase sequence current of said line.

5. In a protective system for electric circuits, a polyphase line subject to the occurrence of fault connections therein, a plurality of selectively operated impedance responsive relays for controlling said line, there being one relay for each phase conductor of said line, each said relay having a potential winding connected to be energized in accordance with the potential of the respective phase conductor upon the occurrence of a fault connection therein, a current winding connected in series relation with the respective phase conductor to be energized in accordance with the current flowing therein, and a winding connected with said line to be energized in accordance with the zero phase current of said line to thereby cause the selective operation of the said relays in dependence on the value of the phase impedance of said line from the point of connection of said relays therewith to the point of said fault connection.

6. In combination with a polyphase electric current circuit, an electroresponsive device for controlling said circuit connected with a phase conductor thereof and selectively operable, upon the occurrence of a fault connection with said phase conductor, in dependence upon the impedance of said phase conductor from the point of connection of said device therewith to the point of said fault connection comprising winding means operatively connected with said phase conductor and responsive to the voltage thereof to ground, and means comprising winding means cooperating with the first said means and operatively connected with said circuit responsive to the flow of current in said phase conductor plus a current proportional to the zero phase current of the line.

7. In combination with a polyphase electric current circuit, an electroresponsive device for controlling said circuit connected with a phase conductor thereof and operable, upon the occurrence of a fault connection in said phase conductor, in dependence upon the impedance of said phase conductor from the point of connection of said device therewith to the point of said fault connection comprising winding means operatively connected with said phase conductor and responsive to the voltage thereof to ground, and means comprising winding means cooperating with the first said means and operatively connected with said circuit responsive to the quantity [line current in said phase conductor plus the quantity (ratio of the zero phase sequence impedance of the circuit to the positive phase sequence impedance of the circuit, minus one) multiplied by the zero phase sequence current of the circuit].

8. In combination with a polyphase electric current circuit, a relay device operatively connected with a phase conductor of said circuit and responsive, upon the occurrence of a fault connection in said conductor, in dependence upon the impedance of said conductor from the point of the connection thereof with said conductor to the point of said fault connection comprising winding means operatively connected with said conductor and responsive to the voltage thereof to ground, means comprising winding means cooperating with the first said means and operatively connected with said circuit responsive to the current in said conductor, and winding means for superimposing on one of said means a current proportional to the zero phase sequence current of the said circuit.

9. In a protective system for electric circuits, a polyphase line subject to the occurrence of fault connections therein, a plurality of relays for controlling said line, there being one relay for each phase conductor of said line, each said relay having a potential winding and a current winding connected with said line in such manner as to cause selective operation of the relays upon the occurrence of fault connections therein in dependence upon the phase voltage divided by the quantity [line current in said phase conductor plus the quantity (ratio of the zero phase sequence impedance of the line to the positive phase sequence impedance of the line, minus one) multiplied by the zero phase sequence current].

10. In a protective system for electric circuits, a polyphase line subject to the occurrence of fault connections therein, a plurality of relays for controlling said line, there being one relay for each phase conductor of said line having a potential winding and a current winding connected to be selectively operatively energized in accordance with the voltage and the current respectively of the respective phase conductors upon the occurrence of a fault connection therein, and means for superimposing on the said current coil of each said relay a current proportional to the zero phase sequence current of said line to thereby cause the said relays to operate in dependence upon the voltage of the respective phase conductors divided by the quantity (line current in the respective phase conductors plus the said current proportional to the zero phase sequence current of said line).

11. In a protective system for electric circuits, a polyphase line, a plurality of relays for controlling said line, there being one relay for each phase of said line having a potential winding and a current winding connected with the respective phase conductors operatively energized in dependence upon the voltage and current of the respective phase conductors upon the occurrence of a fault connection therein, a common return conductor included in the circuit of said current coils, and current transformers energized from said conductor operative to impress upon the respective said current coils a current proportional to the zero phase sequence current of the line to thereby cause the said relays to operate in accordance with the impedance of the line between the point of connection of the said relays therewith and the point of the fault connection therein.

12. In combination with a polyphase electric current circuit, a relay device operatively connected with a phase conductor of said circuit and responsive, upon the occurrence of a ground fault connection with said phase conductor in dependence upon the impedance of said conductor from the point of connection of said relay therewith to the point of the said fault connection comprising winding means operatively connected with said conductor and responsive to the voltage thereof to ground, means comprising winding means cooperating with the first said means and operatively connected with said circuit responsive to the current in the said conductor plus the sum of the currents flowing in all phase conductors of said circuit, and means differentially responsive to the action of the first and second said means.

13. In combination with a polyphase electric current circuit, a relay device operatively associated with a phase conductor of said circuit and responsive, upon the occurrence of a fault connection with said conductor, in dependence upon the impedance of said conductor from the point of connection of said relay therewith to the point of said fault connection comprising winding means operatively connected with said conductor and responsive to the voltage thereof to ground, means comprising winding means cooperating with the first said means and operatively connected with said circuit responsive to a function of the current in said conductor and of the sum of the currents flowing in all phase conductors of said circuit, and means differentially responsive to the action of the first and second said means.

14. In a protective system, an alternating current line having a plurality of conductors, and a relay for controlling said line and having means connected with one of said conductors and energized therefrom responsive to the voltage thereof to ground, means connected with said conductors and energized therefrom responsive to the current in said one of said conductors and to the sum of the currents in all of said conductors, and an element differentially responsive to the action of the said voltage and current responsive means.

15. In a protective system, an alternating current line having a plurality of conductors, and a relay for controlling said line and having means connected with one of said conductors and energized therefrom responsive to the voltage thereof to ground, means connected with said conductors and energized therefrom responsive to the currents in all said conductors in different proportions, and an element responsive to the joint action of said voltage and current responsive means.

16. In a protective system, an alternating current line having a plurality of conductors, and a relay for controlling said line and having means connected with one of said conductors and energized therefrom responsive to the voltage thereof to ground, means connected with said conductors and energized therefrom responsive to the flow of current in said one of said conductors and to the zero phase sequence current of said line, and an element differentially responsive to the action of the said voltage and current responsive means.

17. In a protective system, an alternating current line having a plurality of conductors, and a relay for controlling said line and having means connected with one of said conductors and energized therefrom responsive to the voltage thereof to ground, means connected with said one of said conductors and energized therefrom responsive to the flow of current therein, an element differentially responsive to the action of said voltage and current responsive means, and means connected with all of said conductors for affecting the operation of said element in dependence upon the zero phase sequence current of said line.

18. In a protective system, an alternating current line having a plurality of conductors, and a relay for controlling said line and having a winding connected with one of said conductors and energized therefrom in dependence on the voltage thereof to ground, a winding connected with said one of said conductors and energized therefrom in dependence on the flow of current therethrough cooperating with another winding connected with all said conductors and energized therefrom in dependence on the sum of the currents of said conductors, and an element differentially responsive to the action of said voltage and current windings.

19. In a protective system, an alternating current line having a plurality of conductors, and a relay for controlling said line and having a winding connected with one of said conductors and energized therefrom in dependence on the voltage thereof to ground, a winding connected with said conductors and energized therefrom in dependence on the current in said one of said conductors and on the sum of the currents in said conductors, and an element differentially responsive to the action of said voltage and current windings.

GEORGES DARRIEUS.